(12) United States Patent
Armstrong et al.

(10) Patent No.: US 6,702,359 B2
(45) Date of Patent: Mar. 9, 2004

(54) MULTI-PANEL TONNEAU COVER

(75) Inventors: Bradford D. Armstrong, Barrie (CA); Willi Sitkei, Mississauga (CA)

(73) Assignee: Decoma Exterior Trim Inc., Concord (CA)

( * ) Notice: Subject to any disclaimer, the term of this patent is extended or adjusted under 35 U.S.C. 154(b) by 0 days.

(21) Appl. No.: 10/362,065

(22) PCT Filed: Aug. 17, 2001

(86) PCT No.: PCT/CA01/01175
§ 371 (c)(1),
(2), (4) Date: Feb. 18, 2003

(87) PCT Pub. No.: WO02/14096
PCT Pub. Date: Feb. 21, 2002

(65) Prior Publication Data
US 2003/0184115 A1 Oct. 2, 2003

Related U.S. Application Data
(60) Provisional application No. 60/225,935, filed on Aug. 17, 2000.

(51) Int. Cl.[7] .................................................. B60P 7/02
(52) U.S. Cl. ............................ 296/100.02; 296/100.17; 296/136.03
(58) Field of Search ....................... 296/100.01, 100.02, 296/100.03, 100.04, 100.06, 100.07, 100.17, 136.03, 37.6

(56) References Cited
U.S. PATENT DOCUMENTS

| | | | |
|---|---|---|---|
| 3,649,072 A | | 3/1972 | Cross |
| 4,199,188 A | * | 4/1980 | Albrecht et al. ........ 296/100.04 |
| 4,406,493 A | * | 9/1983 | Albrecht et al. ........ 296/100.04 |
| 4,550,945 A | | 11/1985 | Englehardt |
| 4,946,217 A | | 8/1990 | Steffens et al. |
| 5,427,428 A | * | 6/1995 | Ericson et al. ................. 296/98 |
| 5,795,011 A | * | 8/1998 | Flentge ................... 296/100.01 |
| 5,961,173 A | | 10/1999 | Repetti |
| 5,979,963 A | * | 11/1999 | Jordon ........................ 296/37.6 |
| 6,039,379 A | * | 3/2000 | Jordan ........................ 296/37.6 |
| 6,095,588 A | * | 8/2000 | Rodosta ................. 296/100.09 |
| 6,176,541 B1 | * | 1/2001 | Hoff ....................... 296/100.09 |
| 6,186,575 B1 | * | 2/2001 | Fisher et al. ........... 296/100.03 |
| 6,224,138 B1 | * | 5/2001 | Adsit et al. ............. 296/100.05 |
| 6,302,468 B1 | * | 10/2001 | Steadman .............. 296/100.04 |
| 6,527,330 B1 | * | 3/2003 | Steffens et al. ......... 296/100.07 |
| 6,533,343 B2 | * | 3/2003 | Bohm et al. ........... 296/100.02 |

FOREIGN PATENT DOCUMENTS

EP 0 303 386 2/1988

* cited by examiner

Primary Examiner—D. Glenn Dayoan
Assistant Examiner—Patricia L. Engle
(74) Attorney, Agent, or Firm—Clark Hill PLC

(57) ABSTRACT

A tonneau cover (10) for use on automotive vehicle has a plurality of panels (12, 14, 16). Each panel has a leading edge and a trailing edge configured to interlock with an adjacent panel. A pair of rails (18, 20) are mounted on opposite side walls (38, 40) of the vehicle in a position to support the panels. Each of the rails has a pivotally mounted plate (44) which pivots between a storage condition enabling the panels (12, 14, 16) to be received and stored between the rails and an operative condition supporting the panels. A plurality of latch assemblies (22, 42) operatively extends between each of the panels and each of the pair of rails. The latch assemblies (22, 42) selectively secure the plurality of panels (12, 14, 16) to the rails (18, 20).

20 Claims, 4 Drawing Sheets

US 6,702,359 B2

MULTI-PANEL TONNEAU COVER

This application claims the benefit of Provisional application No. 60/225,935 filed on Aug. 17, 2000.

FIELD OF INVENTION

This invention relates to a multi-panel tonneau cover for use on an automotive vehicle. In particular, this invention relates to a tonneau cover that can be easily stored on the vehicle when not in use.

BACKGROUND OF THE INVENTION

Hard tonneau covers are becoming increasingly popular as an added option for pick up trucks. The tonneau cover overlies the bed of a pick up truck to provide covered storage in the bed and also improve vehicle aerodynamics.

Tonneau covers are sized to be slightly larger than the truck bed. The tonneau covers overlies the upper edges of the walls of the truck bed. As a result, the tonneau cover cannot fit within the truck bed when not in use or if taller objects are being transported. The tonneau cover must be removed and stored separately from the vehicle.

On vehicle storage of tonneau covers has not been adequately addressed. U.S. Pat. No. 5,503,450 provides a tonneau cover which pivots to allow for taller objects to be carried. However, when the tonneau cover is elevated, the wind loads on the tonneau cover make such a system unstable at highway speeds.

U.S. Pat. Nos. 4,313,636; 4,844,531; and 5,636,893 provide a tonneau cover made of several smaller panels. The panels are pivotally joined together so that the panels may be folded over each other to be stored overlying the forward end of the truck bed. The manner of the folds limits the tonneau cover to be either fully closed or fully folded.

SUMMARY OF THE INVENTION

The disadvantages of the prior art may be overcome by providing a multi-panel tonneau cover which may be securely attached to the walls of the truck bed and which may be conveniently stored in a rack provided in the truck bed.

According to one aspect of the invention, there is provided a tonneau cover having a plurality of panels. Each panel has a leading edge and a trailing edge configured to interlock with an adjacent panel. A pair of rails is mounted on opposite side walls of the vehicle in a position to support the panels. Each of the rails has a pivotally mounted plate which pivots between a storage condition enabling the panels to be received and stored between the rails and an operative condition supporting the panels. A plurality of latch assemblies operatively extends between each of the panels and each of the pair of rails. The latch assemblies selectively secure the plurality of panels to the rails.

BRIEF DESCRIPTION OF THE DRAWINGS

In drawings which illustrate embodiments of the present invention.

DETAILED DESCRIPTION OF THE INVENTION

Figure 1:
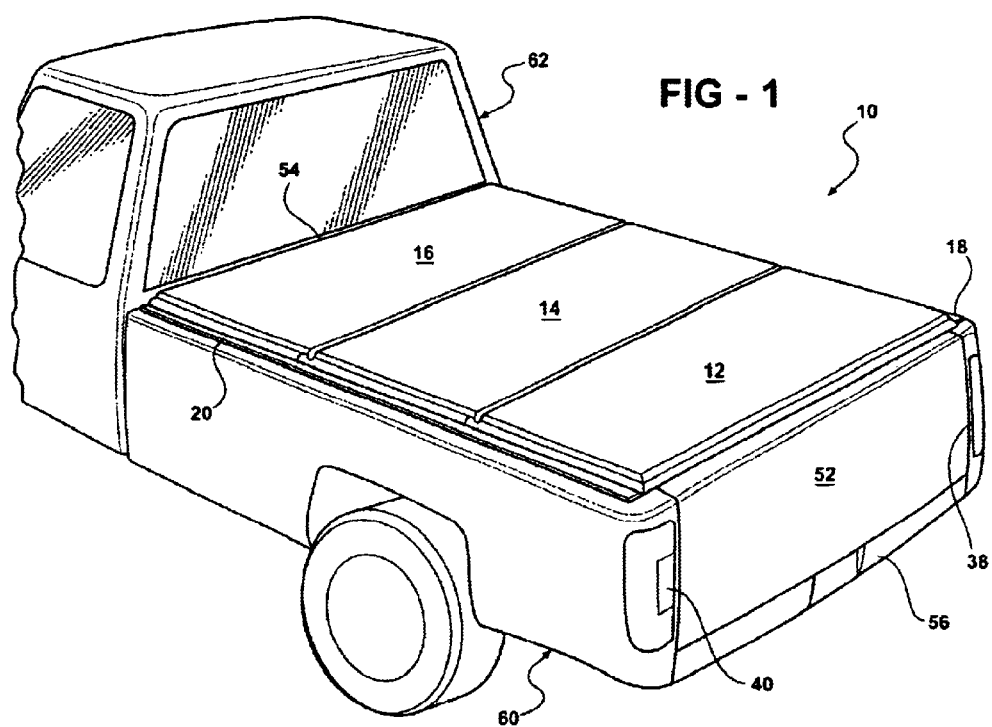
FIG. 1 is a perspective view of a pick up truck with the tonneau cover of the present invention illustrated in the covering or operable condition.

Referring to FIG. 1, the tonneau cover 10 of the present invention is generally illustrated. The tonneau cover 10 generally comprises a plurality of generally planar panels 12, 14, 16 and pair of side rails or brackets 18 and 20. The tonneau cover 10 is adapted to be removably mounted to a cargo bed 60 of a vehicle 62, such as a pickup truck. The cargo bed, or truck bed, 60 is generally defined by spaced apart and generally vertical side walls 38, 40 extending longitudinally between a rear or trailing tailgate 52 and a forward or leading wall 54, each of which are interconnected by a planar and generally horizontal load floor 56.

Preferably, panels 12, 14, 16 are equally sized and have a width less than the width of the truck bed 60 defined between the side walls 38, 40. The combined length of the panels 12, 14, 16 are such that the truck bed 60 is fully covered. Panels 12, 14, 16 can be made of any suitable material such as FRP (fibre reinforced plastic) or other known foam composite constructions. Preferably, the tonneau cover 10 of the present invention comprises three panels 12, 14, 16 of like size and construction. However, it is now readily apparent to those skilled in the art that panels 12, 14, 16 can be of different sizes and construction depending on the size and shape of the truck box.

Figure 2:
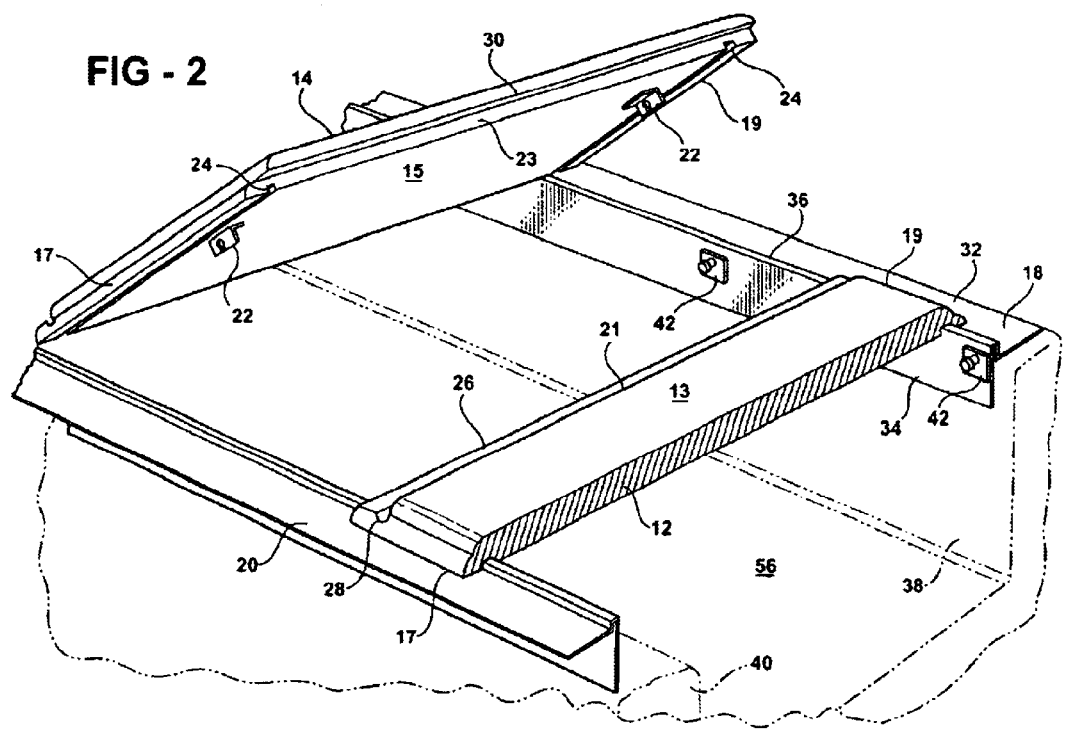
FIG. 2 is a perspective view of the tonneau cover of FIG. 1 with one of the panels being removed.

Referring to FIG. 2, each panel 12, 14, 16 includes a topside 13, an underside 15 and opposite ends 17, 19. Each of panels 12, 14, 16 has at least one pair of latch assemblies, each latch assembly comprising a latch 22 and a striker 42. At least one latch 22 is preferably fixedly secured to the underside 15 adjacent each end 17, 19 of the panels 12, 14, 16. The latches 22 are preferably ganged together by a lever, as is commonly employed on vehicle tailgates and liftgates, so that the latches 22 on opposite sides of each of the panels 12, 14, 16 may be operated simultaneously between a latched and unlatched condition.

Each end 17, 19 of the panels 12, 14, 16 have longitudinally extending underside grooves 24 extending between the leading edge 21 and the trailing edge 23 of each panel 12, 14, 16. The leading edge of each of the panels 12, 14, 16 has a tongue 26 with a transversely extending recessed water channel 28 extending between the opposite ends 17, 19. The trailing edge of each of the panels 12, 14, 16 has a lip 30. When the panels 12, 14, 16 are in a side by side relation, the lip 30 of one panel 14 will interlock in an overlapping manner with the tongue 26 of another adjacent panel 12, as shown in FIGS. 1 and 2. Water flowing between the panels 12, 14, 16 will flow outwardly along water channel 28 to the ends 17, 19 of the panels 12, 14 16 and outside the side walls 38, 40 of the vehicle 62.

Rails 18, 20 are mirror images of each other and thus the present invention will be described in relation to rail 18.

Figure 3:
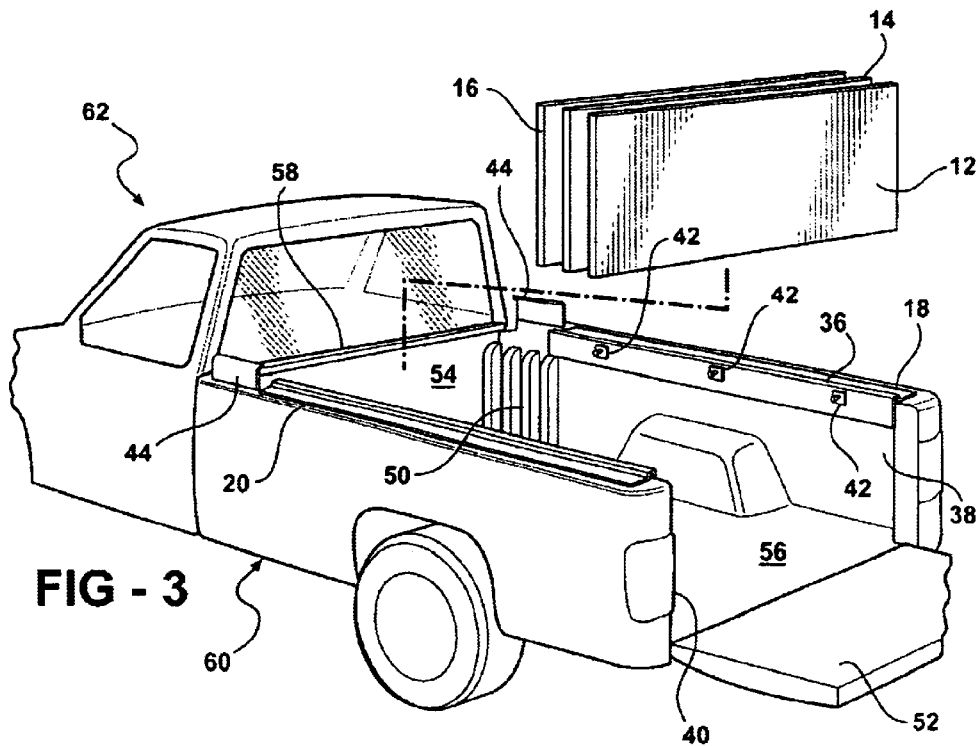
FIG. 3 is a perspective view of the tonneau cover of FIG. 1 with the panels being moved to the stored condition.
Figure 4:
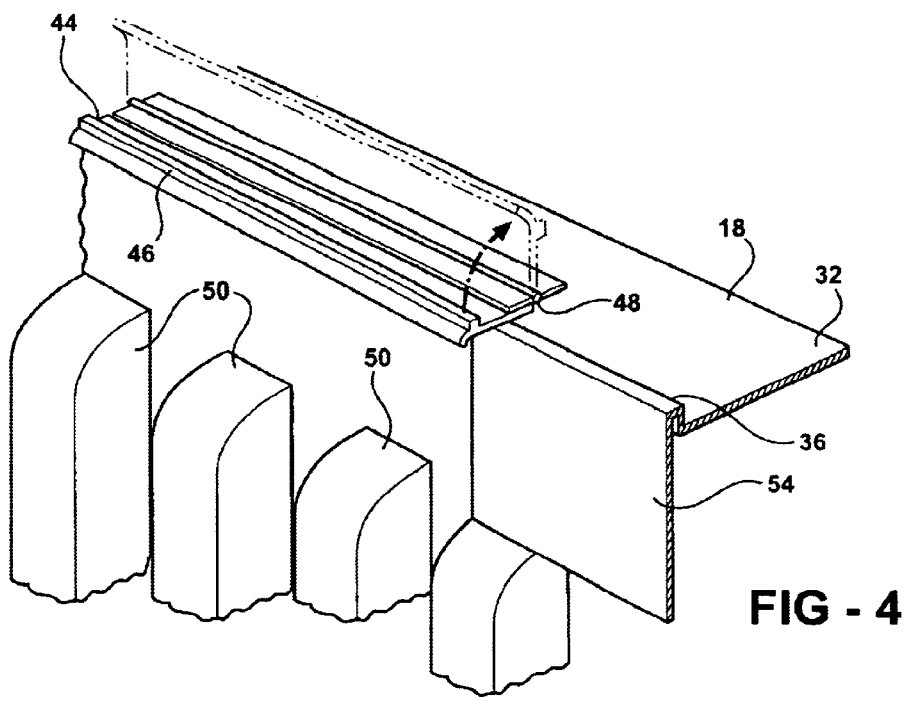
FIG. 4 is a partial perspective view of the storage racks of the tonneau cover of FIG. 3.

Referring to FIGS. 2, 3 and 4, rail 18 is elongated and extends the length of wall 38 between the forward wall 54 and tailgate 52. Rail 18 has a generally L-shaped cross section having an upper flange 32 and vertical flange 34. The corner between the flanges 32, 34 defines an upwardly extending guide 36. Preferably, the upper flange 32 is seated and secured on top of the walls 38, 40 such that the guide 36 and vertical flange 34 extend into the volume of the truck bed, i.e. inwardly of the walls 38, 40 of the vehicle. The guides 36 are positioned to receive the underside grooves 24 of the panels 12, 14, 16. Guides 36 present a water barrier so that water will flow outwardly along upper flange 32 and outside of the walls 38, 40.

A plurality of strikers 42 is secured to, extend from and are spaced along the vertical flange 34. The number of strikers 42 correspond with the number of latches 22 for engagement therewith and the number of panels 12, 14, 16. The latch assemblies extend between each of the panels 12, 14, 16 and the rails 18, 20. The illustrated embodiment has the latch 22 on the panels 12, 14, 16 and the striker 42 on the rails 18,20. However, it is apparent to those skilled in the art that the latch could also be mounted the rails 18, 20 and the striker mounted on panels 12, 14, 16 with equal results. Any type of latch assemblies as are commonly used in the automotive industry could be utilized.

Referring to FIGS. 3 and 4, the forward end of the rail 18 adjacent the forward wall 54 has a hinged plate 44. The hinge plate 44 has an upwardly extending guide 46 which when in an operative condition, is co-extensive with guide 36. The plate 44 also has a hinge 48 for pivotally coupling the plate 44 to the upper flange 32 which allows the plate 44 to move between the operative condition aligned with the upper flange 32 and a storage condition pivoted upwardly and outwardly as shown in phantom in FIG. 4. In the storage condition, the plate 44 is folded outwardly increasing the distance available between the rails 18, 20, enabling panels 12, 14, 16 to fit width-wise between walls 38, 40.

Rails 18, 20 are preferably formed of sheet steel or aluminum. However, other materials, such as plastic, may also be used for the rails 18, 20. Rails 18, 20 are mounted to the walls 38, 40 is any conventional manner, such as with fasteners or adhesive.

Figure 5:
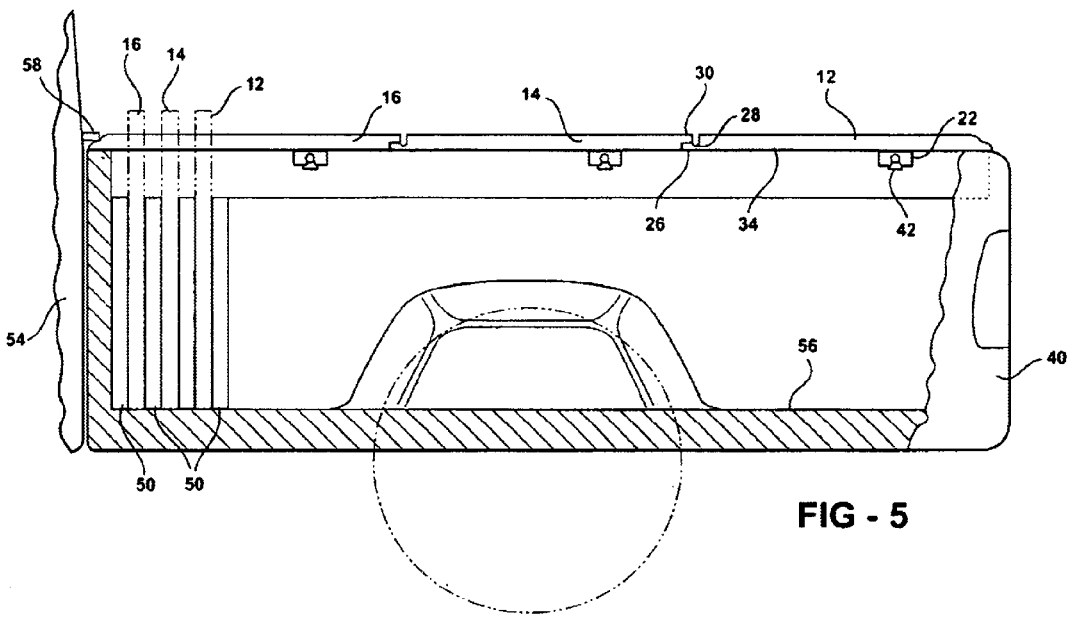
FIG. 5 is a side elevational view of the tonneau cover of FIG. 1 with the panels in the stored condition.

The forward or leading ends of the side walls 38, 40 have spacers 50 extending from the load floor 56 to the bottom of the rails 18, 20. The spacers 50 are spaced apart and generally parallel to receive each of panels 12, 14, 16 therebetween in a vertical orientation, as shown in FIGS. 4 and 5.

In operation, the panels 12, 14, 16 are positioned in a side by side relationship overlying the truck bed 60 with the underside grooves 24 receiving the guides 36 extending upwardly from the rails 18,20 to seal the panels 12, 14, 16 between the rails 18, 20. Panel 16, which is the leading panel, tucks under a flange 58 to interlock therewith on the upper edge of the forward or leading wall 54 of the bed. The latches 22 releaseably and lockingly engage the strikers 42 to secure the panels 12, 14, 16 on the vehicle. The trailing lips 30 overlay the tongues 26 of the side by side panels 12, 14, 16 to interlock and seal the panels 12, 14, 16 between the forward wall 54 and the tailgate 52. To store the panels 12, 14, 16, the tailgate 52 is opened allowing access to the underside of the panels 12, 14, 16. The latches 22 are unlatched from the strikers 42 releasing the panels 12, 14, 16 from the rails 18, 20. The plates 44 are pivoted about hinge 48 to the storage position which allows each of the panels 12, 14, 16 to be received between the spacers 50 for storage in a vertical condition transversely extending between the opposing side walls 38, 40 of the truck bed 60 adjacent the forward wall 54. Alternatively, each of the panels 12, 14, 16 may be stacked one on top of the other and supported by the Tails 18, 20 adjacent the forward wall 54 of the truck bed 60.

The above-described embodiment of the invention is intended to be an example of the present invention and alterations and modifications may be effected thereto, by those of skill in the art, without departing from the scope of the invention.

What is claimed is:

1. A tonneau cover for use on an automotive vehicle comprising:
    a plurality of panels, each having a leading edge and a trailing edge configured to interlock with an adjacent one of said panels,
    a pair of rails mountable on opposite side walls of the vehicle in a position to support said panels, each of said rails having a pivotally mounted plate which pivots between a storage condition enabling said panels to be received and stored between said rails and an operative condition, and
    a plurality of latch assemblies operatively extending between each of said panels and each of said pair of rails, said latch assemblies selectively securing said plurality of panels to said rails.

2. A tonneau cover as set forth in claim 1 wherein said tonneau cover further comprises a flange extending between said pair of rails at a leading end thereof and configured to interlockingly receive a leading one of said panels.

3. A tonneau cover as set forth in claim 2 wherein each of said rails include an upper flange and a vertical flange extending generally perpendicular from said upper flange and having an upwardly extending guide.

4. A tonneau cover as set forth in claim 3 wherein each of said panels include a longitudinally extending groove recessed in said underside adjacent each end of said panels and extending between a leading edge and a trailing edge of said panel for receiving and matingly engaging with said upwardly extending guides of said rails.

5. A tonneau cover as set forth in claim 4 further including a hinge for pivotally mounting said plate to said upper flange of said rail for movement between an operative condition aligned with said upper flange and said storage condition pivoted upwardly and outwardly from said vertical flange.

6. A tonneau cover as set forth in claim 5 wherein said plate includes an elongated guide for alignment with said upwardly extending guide of said rail when said plate is in said operative condition.

7. A tonneau cover as set forth in claim 6 wherein said interlock of each of said panels includes a tongue extending from said leading edge and a lip projecting from said trailing edge for overlapping with a corresponding lip of the adjacent panel.

8. A tonneau cover as set forth in claim 7 wherein each of said panels includes a transversely extending water channel recess on said tongue between said opposite ends for draining water between said adjacent panels.

9. A tonneau cover as set forth in claim 1 or 8 wherein said tonneau cover further comprises plurality of spacers mountable to said vehicle and positioned to align said panels when stored between said rails.

10. A tonneau cover as set forth in claim 9 wherein said spacers align said panels in a vertically extending orientation.

11. In combination, a vehicle and a tonneau cover, said vehicle having a cargo bed surrounded by a forward wall, spaced apart side walls and a rear tailgate, said tonneau cover comprising:
    a plurality of panels, each having a leading edge and a trailing edge configured to interlock with an adjacent one of said panels,
    a pair of rails mounted on said side walls in a position to support said panels, each of said rails having a pivotally mounted plate which pivots between a storage condition enabling said panels to be received and stored between said rails and an operative condition, and a plurality of latch assemblies operatively extending between each of said panels and each of said pair of rails, said latch assemblies selectively securing said plurality of panels to said rails.

12. A combination as set forth in claim 11 further comprising a flange extending between said pair of rails at a leading end thereof and configured to interlockingly receive a leading one of said panels.

13. A combination as set forth in claim 12 wherein each of said rails include an upper flange and a vertical flange extending generally perpendicular from said upper flange and having an upwardly extending guide.

14. A combination as set forth in claim 13 wherein each of said panels include a longitudinally extending groove recessed in said underside adjacent each end of said panels and extending between a leading edge and a trailing edge of said panel for receiving and matingly engaging with said upwardly extending guides of said rails.

15. A combination as set forth in claim 14 further including a hinge for pivotally mounting said plate to said upper flange of said rail for movement between an operative condition aligned with said upper flange and said storage condition pivoted upwardly and outwardly from said vertical flange.

16. A combination as set forth in claim 15 wherein said plate includes an elongated guide for alignment with said upwardly extending guide of said rail when said plate is in said operative condition.

17. A combination as set forth in claim 16 wherein said interlock of each of said panels includes a tongue extending from said leading edge and a lip projecting from said trailing edge for overlapping with a corresponding lip of the adjacent panel.

18. A combination as set forth in claim 17 wherein each of said panels includes a transversely extending water channel recess on said tongue between said opposite ends for draining water between said adjacent panels.

19. A combination as set forth in claim 18 further comprising a plurality of spacers mounted on said side walls of said vehicle and positioned to align said panels when stored between said rails.

20. A combination as set forth in claim 19 wherein said spacers align said panels in a vertically extending orientation.

* * * * *